United States Patent [19]

Gebert

[11] 3,773,298

[45] Nov. 20, 1973

[54] PROCESS AND APPARATUS FOR THE PRODUCTION OF PLASTIC MATERIALS AND PLASTIC FOAMS FROM LIQUID REACTIVE CHEMICAL COMPONENTS EMPLOYING MODIFIED INJECTION NOZZLES

[76] Inventor: Victor L. Gebert, Rua Gurindibia 162, Apt. 104, Rio de Janeiro, Brazil

[22] Filed: Mar. 1, 1971

[21] Appl. No.: 119,715

[52] U.S. Cl. .................................. 259/4, 23/252 R
[51] Int. Cl. .............................................. B01f 15/04
[58] Field of Search .................... 259/4, 18, 7, 8, 259/36, 43, 45; 23/252; 264/41, 42, 43, 54, 55; 239/61; 137/606

[56] References Cited
UNITED STATES PATENTS

| | | | |
|---|---|---|---|
| 2,847,196 | 8/1958 | Franklin | 259/8 |
| 3,068,074 | 12/1962 | Boekemeier | 259/8 |
| 3,450,159 | 6/1969 | Wilkin | 137/606 |
| 2,894,732 | 7/1959 | Taber | 23/252 R |
| 3,056,661 | 10/1962 | Breer | 259/4 |
| 3,171,721 | 3/1965 | Strathearn | 23/252 R |
| 3,424,439 | 1/1969 | Baker | 259/4 |

Primary Examiner—Robert W. Jenkins
Attorney—Seed, Berry & Dowrey

[57] ABSTRACT

Methods and equipment for eliminating pre- and post-flow of liquid chemical reactants employed in the production of plastic material or plastic foams by injection of each of the reactants through high-pressure nozzles is disclosed. Combination signal/needle valve pressure modified injection nozzles give visual indication of the opening of the needle valves of the injection nozzles for each of the liquid reactants, thereby enabling synchronization of the opening of the valves, and eliminating pre-flow of either of the components. The needle valves of each of the nozzles are closed at essentially the same time by pressure means exerting a pressure on the needle valves of each nozzle, additional to that of the pressure spring which regulates the normal opening pressure thereof, thereby forcing the needle valves of each of the nozzles into closed position at substantially the same instant and eliminating post-flow of either of the components. Alternately, signal nozzles or needle valve pressure nozzles can be used singly to control both pre- and post-flow of either of the liquid components.

8 Claims, 2 Drawing Figures

INVENTOR.
VICTOR L. GEBERT

BY
Seed, Berry, Downey
ATTORNEYS

PROCESS AND APPARATUS FOR THE PRODUCTION OF PLASTIC MATERIALS AND PLASTIC FOAMS FROM LIQUID REACTIVE CHEMICAL COMPONENTS EMPLOYING MODIFIED INJECTION NOZZLES

BACKGROUND OF THE INVENTION

1. Field of the Invention

This invention relates to apparatus and methods for eliminating pre- and post-flow of liquid chemical components used in the manufacture of polyurethane, isocyanurate, and other plastic foams produced by crosslinking or trimerization. The liquid components are mixed in a predetermined ratio by means of high-pressure injection nozzles modified to eliminate pre- and post-flow of the liquid reactants.

2. Prior Art Relating to the Disclosure

Plastic foams, such as polyurethane foams, are obtained from a reactive mixture of a polyol or polyols, polyisocyanate or polyisocyanates, and additional components such as catalysts, activator systems and blowing agents (monofluorotrichloromethane). Polyisocyanurate foams are obtained generally from the reaction of polyisocyanates and a catalyst by means of trimerization with all of the components being mixed in the liquid state. In order to economically produce flexible, semi-rigid, or rigid foams economically, multi-component metering units must be used which can be operated without material loss and which can be started or stopped without creating inaccuracies in the weight ratio of the reactive components. The reactive components which generate the plastic foams must generally be thoroughly homogenized and exactly metered into the mixing chamber in the desired ratio during the entire operation in order to form an adequate foam of the desired properties.

Two general methods have been used for mixing the reactive components: (1) mixing the components in a relatively large mixing chamber by means of a suitable agitator; and (2) mixing the components by injection thereof into a small mixing chamber through high-pressure injection nozzles. By either method, the plastic foam forms in a few seconds after mixing of the components. The mixture expands, hardens and becomes insoluble in most solvents and adheres to most materials which it contacts. The insolubility of such plastic foams and their characteristic of adhering to materials which they contact creates a number of problems in the first method outlined above, i.e. the mixing chamber/agitator method, for every time the foaming process is interrupted, the relatively large mixing chamber must be cleaned before the foam hardens therein, otherwise material and time is lost. The greatest utility of foaming plastics is generally in molding, which requires constant interruption of the process for changing of the molds, and thus requires constant interruption of the mixing process. If the mixing chamber/agitating method is used, it must be constantly interrupted and with resulting loss of materials and time.

By employing injection nozzles which inject the liquid reactive components under high pressure into a small mixing chamber, e.g. 1 cm.$^3$, neither loss of material and time nor clogging of the discharge opening occurs, irregardless of the number of times the mixing process is interrupted. The high-pressure injection nozzles normally used, however, have the problem of pre- and/or post-flow of liquid reactants through the nozzles due to unsynchronized opening of one or more of the nozzles causing premature injection of one or more components, or post-flow of one or more of the components when the flow of reactants is stopped. When using high-pressure injection nozzles, delivery of the reactive components to their respective nozzles is usually accomplished by metering pumps which force the material under relatively high pressure through the injection nozzles and to the small mixing chamber, the mixed components then being delivered under pressure to the mold or other desired location. When delivery of the reactive components is initiated, the working pressure of each of the components builds up at different speeds and at different rates depending upon the weight ratio of the components used and the differing viscosities of the components. The component of which more is delivered per minute and which possesses a lower degree of viscosity, penetrates through the nozzle earlier than the other component. Assuming the opening pressure of the respective injection nozzles is the same, one injection nozzle will open prior to the other resulting in pre-flow of one of the reactants. One suggested solution to the pre-flow problem of such injection nozzles has been to effect differential opening pressures of the nozzles or use different lengths of pressure hoses carrying the reactive components from the metering pumps to the nozzles. Another solution has been to include a storage plunger on the collection chamber of one of the metering pumps, the storage plunger allowing an independent volume increase of the pressure line which is adjustable in its size. By so doing, it is possible to adjust a time-delay for build-up of the nozzle opening pressure with desired adjustment of the storage plunger effected by means of an automatic control unit having micrometer divisions.

Post-flow of one or more of the reactive components occurs at the end of delivery of the reactive components into the mixing chamber. When the working pressure drops below the closing pressure of the injection nozzles, the valves close. However, a pressure drop of, for example, 200 kg./cm.$^2$ gauge to 80 kg./cm.$^2$ gauge requires more time than a pressure drop of a lower viscosity component, say from 150 kg./cm.$^2$ gauge to 80 kg./cm.$^2$, thus causing a differential in the time period of closing of the injection nozzles. A suggested solution to the post-flow problem of injection nozzles has been to adapt the pressure reduction time of the component under lower pressure to the pressure reduction time of the component under higher pressure by means of an adjustable hydraulic brake or release valve which can be controlled with respect to time. For example, when the metering pumps for the reactive components are turned off, an electrically controlled pneumatic cylinder at the same time opens a release valve which connects the intake and pressure sides of the pumps. The time it takes for the pressures to equalize is controlled by varying the cross-sectional opening of the release valve. Alteration of the cross-section is effected by means of a control rod adjustable by means of a micrometer screw.

The solution to pre- and post-flow outlined above requires very complicated high-precision equipment such as a storage plunger assembly, a release valve assembly and pneumatic equipment. In spite of such high-precision equipment, controlled synchronization of the opening and closing of the needle valves of high-pressure injection nozzles is not possible prior to commencing operation, for the required adjustment of the micrometers of the storage plunger and the release valve must be determined by a number of trial foamings. In practice, these trail foamings have resulted in a tremendous loss of time and material, for production failures can only be seen after curing and demolding the test articles. Any corrections must be made empirically by trial and error. In actual practice, such corrections must be made rather often in that they are generally caused by changes in temperature which alter the viscosity of the components differently. A need of correction is indicated by defective production and, in large scale production, a large number of defective articles manufactured in the time interval between injection of the first defective product and its discovery after curing result in a tremendous waste of material and time.

SUMMARY OF THE INVENTION

The present invention is directed to methods and means for preventive correction of pre- and post-flow of liquid chemical reactive components through high-pressure injection nozzles into a mixing chamber for production of plastic foams. The modified injection nozzles of this invention are designed to prevent pre- and post-flow instead of correcting pre- and post-flow by subsequent adjustments or trial and error with loss of both time and material.

It is thus a primary object of this invention to provide a method and apparatus for the production of plastic foams from liquid reactive components employing injection nozzles of special design for injection of each of the reactive components under relatively high pressures into a mixing chamber.

It is a further object of this invention to provide a method and apparatus for the production of plastic foams utilizing high pressure injection nozzles for each of the components wherein opening of the needle valves of each of the nozzles is indicated by electro-visual means and the pressure required to open the respective needle valves is controlled or adjusted until opening of the valves is synchronized.

It is a further object of this invention to provide a method and apparatus for controlling pre- and post-flow in the production of plastic foams utilizing high-pressure injection nozzles which employ electro-visual means to synchronize opening of the needle valves of the respective high-pressure nozzles to eliminate pre-flow and which also employ pressure means exerting additional pressure on the respective needle valves, forcing them into closed position, thereby eliminating post-flow.

It is a further object of this invention to provide a method and apparatus for the production of plastic foam using two or more liquid reactive components by injection of each component through modified high-pressure nozzles, the nozzles having pressure means associated therewith which exert a pressure on the respective needle valves additional to the pressure normally exerted on the needle valves regulating the opening pressure thereof.

DESCRIPTION OF THE PREFERRED EMBODIMENTS

One type of high-pressure injection nozzle for injection of chemically reactive components into a mixing chamber is generally known as a "diesel" pulverizer nozzle. Pressure of the material flowing into the high-pressure valve supplied by the metering pump exerts a lifting force against a conical surface on the needle valve of the nozzle, countering the pressure which normally holds the needle in closed position in the discharge orifice, this pressure generally applied by a high-pressure spring. When the pressure of the material against the conical surface exceeds the closing pressure exerted by the pressure, spring, the needle valve is forced open, allowing the material to jet therethrough into the mixing chamber. The closing pressure of the needle valve can be regulated by regulating the spring pressure against the valve.

Figure 1:
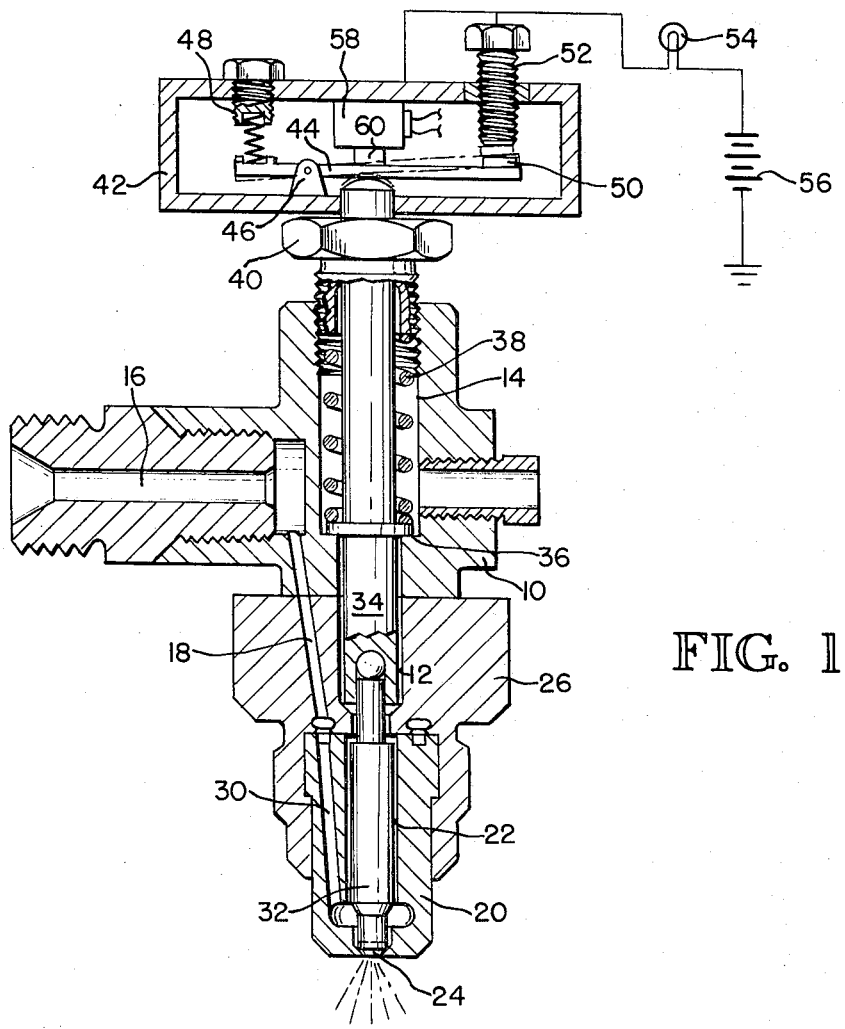
FIG. 1 is a cross section of a high-pressure injection nozzle employing a combination signal/needle valve pressure means to control opening and closing of the needle valve of the nozzle to eliminate pre- and post-flow of liquid reactants flowing therethrough.

Referring to FIG. 1, the high-pressure nozzle comprises a nozzle housing 10 having an annular bore 12 extending therethrough, the upper portion of the bore 14 being of increased diameter. An opening 16 in the housing thereof provides access for entry of the material, the material flowing through the opening into an internal bore 18 which terminates at the lower end of the housing. A nozzle body 20 having an annular bore 22 therein and a discharge orifice 24 at the lower end thereof is connected to the lower end of the nozzle housing 10 and is retained by a screw member 26. The nozzle body 20 also has an internal bore 30 extending down the side thereof which communicates at its lower end with the discharge orifice and at its upper end with internal bore 18 in the nozzle housing 10 to allow flow of material through opening 16 to the discharge orifice 24.

Opening and closing of the discharge orifice is controlled by needle valve 32 disposed in bore 22 of the nozzle body, the valve having a shoulder portion at its lower end which seats against the discharge orifice 24 and seals it. A pressure bolt 34 in contact with the upper end of the needle valve extends through the bore 14 of the nozzle housing. The pressure bolt extends through the upper end of the nozzle housing 10. A pressure spring 38 slips over the pressure bolt 34 and seats against shoulder 36 in the housing at its lower end and is held in place at its upper end by an adjustable hollow threaded member 40 through which the pressure bolt extends. Turning of the threaded member in one direction will reduce the pressure required to open the needle valve while turning the threaded member in the opposite direction will increase the pressure required to open the needle valve.

Secured to the upper end of the threaded member is a signal head housing 42 having a hollow interior. In the hollow interior is pivotally mounted a lever 44 contacting the upper end of the pressure bolt 34 near the pivot point 46, the level pivotable in a vertical plane about the pivot point. The lever 44 has a constant pressure exerted on one end by a regulatable spring 48. At the opposite end of the lever is a contact point 50 positioned below an adjustable contact screw 52 suitably insulated from contact with the signal housing 42. The adjustment screw 52 is suitably wired to a signal lamp 54 powered by a battery 56 or other suitable means. Each movement of the needle valve of the nozzle is transmitted through the pressure bolt to the arm of the lever causing an amplified movement of the end of the arm having the contact point 50 mounted thereon. The amount of movement will be in proportion to the length of the contact point 50 from the pivot point 46. When the end of the arm having the contact point 50 touches the electrical contact of the adjustment screw 52, it closes the circuit and lights the signal lamp 54 which stays lit until the valve 32 closes, shutting off flow of material through the discharge orifice of the nozzle.

When a pair of such nozzles is used to meter predetermined proportions of a resin and catalyst to a mixing chamber, opening of the needle valves of each of the nozzles can be synchronized to eliminate pre-flow of the components by adjusting the opening pressure of the nozzles through the adjustable threaded member 40. The position of the threaded member regulates the opening pressure of the needle valve. Synchronized opening of the needle valves exists if the signal lights of each of the nozzles lights in unison. Adjustment of the hollow threaded member 40 until such synchronized lighting of the signal lamps occurs insures correct flow of the liquid reactants into the mixing chamber without pre-flow.

Figure 2:
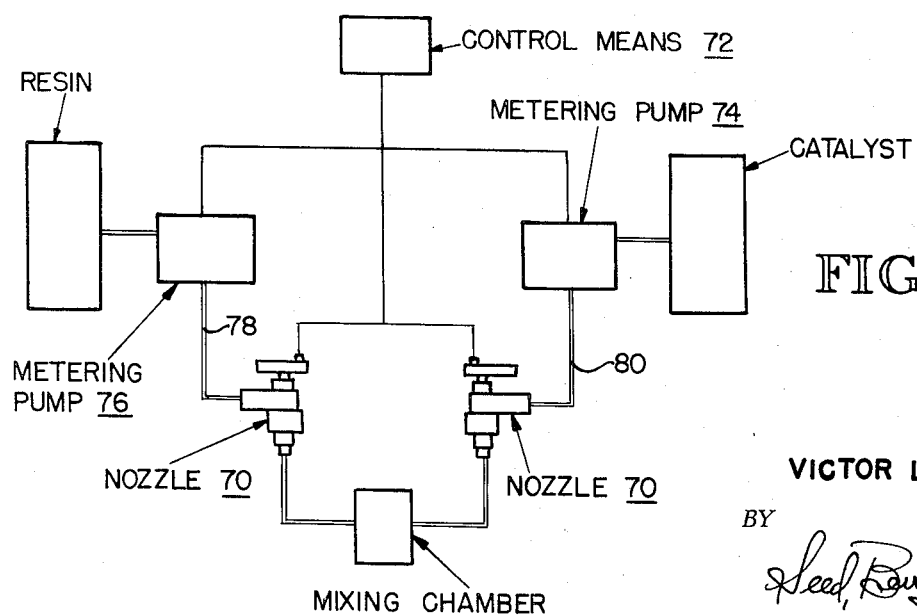
FIG. 2 is a schematic flow diagram of a typical system for production of plastic foams using high-pressure injection nozzles.

Pre- and post-flow of the liquid reactants to the mixing chamber may also be controlled by pressure means exerting a pressure on the needle valves of the injection nozzles additional to that normally biasing the needle valves into closed position. The means for exerting additional pressure on the pressure bolts and the needle valves of each of the injection nozzles may be mechanical, electrical, pneumatic or hydraulic. The pressure means, for example, may be a solenoid whose piston contacts the upper end of the pressure bolt or it may be an air or hydraulic cylinder whose piston contacts the upper end of the pressure bolt. FIG. 1 illustrates, for example, a pneumatic cylinder 58 whose piston 60 is directly above the pressure bolt 34. Activation of the pressure device for each of the injection nozzles 70 (FIG. 2) may be by any conventional means. Preferably control means to activate the pressure devices is also operatively connected to the control means 72 used to start the metering pumps 74 and 76 for the reactive components, as shown in FIG. 2, so that when the metering pumps are switched "on," the pressure devices of each of the injection nozzles are also activated at the same instant. The force exerted on each individual needle valve is, therefore, the sum of the pressures produced by the pressure spring of the injection nozzle and the pressure device. In such case, a very high material pressure builds up in the hoses 78 and 80 leading between the metering pumps and the injection nozzles. When the pressure devices are deactivated, the additional pressure exerted on the pressure bolts of the respective injection nozzles is suddenly removed at the same instant, with the result that the high material pressures built up in the hoses forces the material with great impetus through the injection nozzles. The delicate forces in play in the injection nozzles causing pre-flow are overridden by the sudden eruption of the material on instant deactivation of the additional pressure exerted on the pressure bolt of the nozzle, thereby rendering the pre-flow negligible by compressing the time factor into an instant.

Post-flow through injection nozzles employing the pressure devices is eliminated by activating all of the pressure devices on the respective injection nozzles at the same instant so that the needle valves of the respective injection nozzles are immediately forced to closed position at the same time.

A preferred system for eliminating pre- and post-flow of reactants through high pressure injection nozzles is a combination of the signal nozzle and needle pressure nozzle. This is shown in FIG. 1 wherein the pressure device exerts pressure on the lever arm directly over the pressure bolt. It has been found that the signal nozzle is capable of regulating pre-flow with absolute exactness and that post-flow is best regulated by a pressure device on the needle valve of the nozzle. In the combination nozzle shown in FIG. 1, the signal nozzle concept is used to prevent pre-flow and the needle pressure concept is used to eliminate post-flow. The needle pressure nozzle constitutes a brutal but effective way of eliminating post-flow. Very high pressures generally exist in the hoses between the metering pumps and injection nozzles, when the pressure devices on each of the injection nozzles are activated, to cut off flow of material through their discharge orifices. The pressure increase in the hoses leading from the metering pumps to the injection nozzles rises rapidly and uncontrollably, even if the metering pumps are stopped at the same time. It is preferable, therefore, to incorporate relief valves on the hoses 78 and 80 leading from the metering pumps to the nozzles controlled so that when the pressure devices on the injection nozzles are activated to shut off the flow of material therethrough, the relief valves on the hoses are opened at the same instant or at a regulated time difference to lower the pressure in the hoses to the level of normal opening pressure which is spring regulated by the pressure spring. This gives an exact regulation of post-flow. Regulation of pre-flow by the pressure devices is not as good as the signal nozzle in that, on starting of the metering pumps, there is a pressure difference in the hoses leading from the metering pumps to the injection nozzles. The opening instant of the needle valves in the nozzles may be exactly the same, but the quantities of material injected in the first second might differ due to the different pressure build-up in the hoses. In ninety per cent of the cases, there is not a sufficient difference to notice it in the product, but for best control, pre-flow is preferably regulated with the signal nozzle concept and post-flow by the needle pressure concept. In this case, a pressure device and relief valve should be used. The relief valves lower the pressure in the hoses to the desired level immediately when injection is ended. On injection there is a stable pressure such as 20 kg./cm.$^2$ in the hoses leading from the metering pumps to the injection nozzles. Since there is a stable pressure build-up of reproducible and controlled character, the signal lamps of the signal nozzle are capable of accurately regulating pre-flow.

The described system is simple, exact, easy to handle and can be carried out at a very moderate cost.

The embodiments of the invention in which an exclusive property or privilege is claimed are defined as follows:

1. Apparatus for insuring synchronized opening and closing of needle valves of injection nozzles employed in the production of plastic materials or plastic foams wherein liquid materials of the plastic material or foam are separately injected under relatively high pressure through such nozzles into a mixing chamber, each of the nozzles including a housing having an annular bore therein, the bore at the lower end of the housing forming a discharge orifice for flow of material therethrough, a needle valve disposed in the annular bore movable between a closed position and an open position, the valve in closed position seating against the discharge orifice and preventing flow of the material therethrough, bias means biasing the needle valve to a normally closed position, conduit means in the housing communicating with the discharge orifice and the lower portion of the needle valve seated against the discharge orifice, the pressure of the material metered into the conduit operating to force the needle valve to an open position and allowing flow of the material therethrough to the mixing chamber, the improvement comprising means operatively connected to the valve of each nozzle for controlling pre- and post-flow of the liquid material into the mixing chamber.

2. The apparatus of claim 1 wherein the means is a signal means producing an electro-visual signal mounted to indicate movement of the needle valve of each nozzle from a closed position to an open position or an open position to a closed position, and means for adjusting the pressure of the bias means forcing the needle valve of each nozzle to a normally closed position.

3. The apparatus of claim 2 wherein the signal means includes a lever mounted for pivotal movement, movement of the lever about the pivot point controlled by movement of the needle valve from a closed position to an open position or an open position to closed position, an electrical contact mounted on one end of the lever, a second electrical contact adjacent the first contact on the lever, electro-visual means electrically connected to the first and second electrical contacts so that when the contacts meet with each other, the circuit is completed, resulting in lighting of the signal means.

4. The apparatus of claim 1 wherein the means is pressure means capable of exerting pressure on the needle valve of each nozzle in addition to that exerted by the bias means which regulates the normal opening pressure of the needle valve, and control means operatively connected to the pressure means of each nozzle for simultaneously (1) relieving said additional pressure on the needle valve of each nozzle, allowing them to open at substantially the same time, and (2) applying said additional pressure on the needle valves forcing them to close at substantially the same time.

5. The apparatus of claim 1 wherein the means includes:
signal means producing an electro-visual signal mounted on each injection nozzle to indicate movement of the needle valves thereof, opening of the needle valves completing a circuit resulting in lighting of the signal,
means for adjusting the pressure of the bias means forcing the needle valves to closed position, synchronization of the lighting of each of the signals indicating elimination of pre-flow,
pressure means capable of exerting pressure on the needle valve of each nozzle in addition to that exerted by the bias means which regulates the normal opening pressure of the needle valves, and
control means operatively connected to the pressure means of each injection nozzle for simultaneously (1) relieving said additional pressure on the needle valves to allow them to open, and (2) applying said additional pressure forcing them to close at substantially the same time, thereby eliminating post-flow.

6. A method for insuring synchronized opening and closing of needle valves of injection nozzles employed in the production of plastic materials or plastic foams wherein liquid materials of the plastic material or foam are separately injected under relatively high pressure through such nozzles into a mixing chamber with closing and opening of the needle valves controlled, respectively, by bias means and the pressure of the material flowing therethrough to eliminate pre- and post-flow of the liquid materials, each of the injection nozzles including a signal means producing an electro-visual signal mounted to indicate movement of the needle valve of each nozzle from a closed position to an open position or an open position to a closed position, and adjusting means for adjusting the pressure of the bias means forcing the needle valve of each nozzle to a normally closed position, comprising:
adjusting the pressure exerted on the bias means of each nozzle until the electro-visual signal means on each nozzle lights substantially simultaneously when the needle valves are opened, indicating synchronized opening of the needle valve of each nozzle, thereby eliminating pre-flow of the injected materials.

7. A method for insuring synchronized opening and closing of needle valves of injection nozzles employed in the production of plastic materials or plastic foams wherein liquid materials of the plastic material or foam are separately injected under relatively high pressure through such nozzles into a mixing chamber with closing and opening of the needle valves controlled, respectively, by bias means and the pressure of the material flowing therethrough to eliminate post-flow of the liquid materials and wherein each of the injection nozzles includes pressure means to exert pressure on the needle valve of each nozzle in addition to that exerted by the bias means regulating the normal opening pressure of the needle valves, and control means connected to the pressure means of each injection nozzle to simultaneously relieve the additional pressure on the needle valves to allow them to open substantially simultaneously and apply additional pressure forcing the valves to close substantially simultaneously, comprising:
simultaneously imposing additional pressure on the needle valves by activating the pressure means associated with the needle valves of each nozzle to force them to closed position with additional pressure over and above the pressure of the bias means to eliminate post-flow or reactants into the mixing chamber, and
simultaneously removing the additional pressure on the needle valves of each nozzle to allow them to open at substantially the same time, thereby eliminating pre-flow of reactants into the mixing chamber.

8. The method of claim 7 wherein the additional pressure is imposed mechanically, pneumatically, hydraulically, or electrically.

* * * * *